A. BOTTOM.
ATTACHMENT FOR SEED DRILLS.
APPLICATION FILED JUNE 21, 1913.
1,094,422.
Patented Apr. 28, 1914.
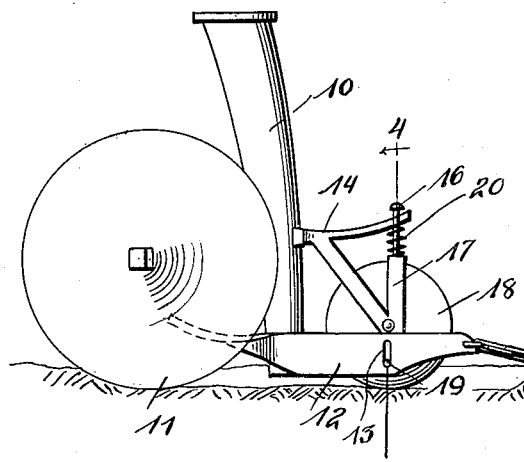
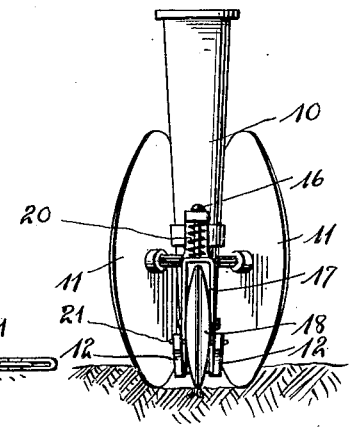
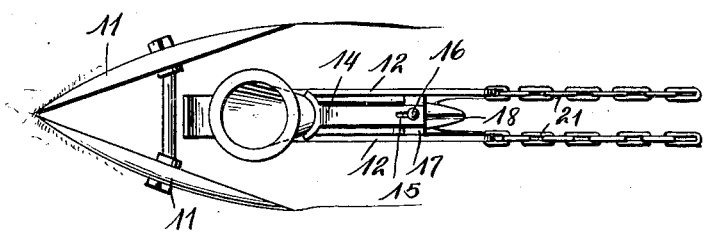
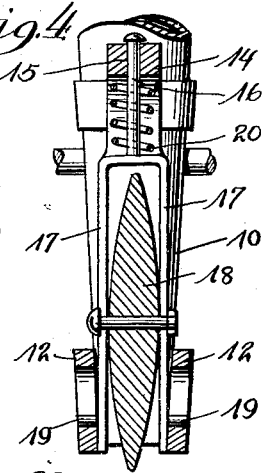
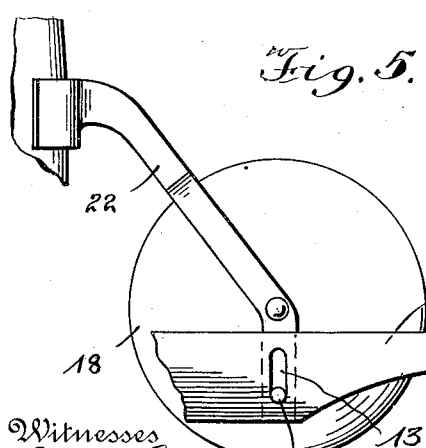
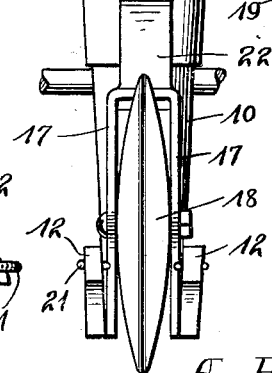

UNITED STATES PATENT OFFICE.

ARTHUR BOTTOM, OF THRONE, ALBERTA, CANADA.

ATTACHMENT FOR SEED-DRILLS.

1,094,422. Specification of Letters Patent. Patented Apr. 28, 1914.

Application filed June 21, 1913. Serial No. 775,021.

*To all whom it may concern:*

Be it known that I, ARTHUR BOTTOM, a subject of the King of Great Britain, residing at Throne, in the Province of Alberta, Dominion of Canada, have invented certain new and useful Improvements in Attachments for Seed-Drills; and I do hereby declare the following to be a full, clear, and exact description of the invention, such as will enable others skilled in the art to which it appertains to make and use the same.

This invention relates to improvements in seed drills.

The principal object is to provide a simple device for attachment to a seed drill which will hold the furrow open to permit the seed to settle to the bottom, and then press the seed to a uniform depth.

Other objects and advantages will be apparent from the following description when taken in connection with the accompanying drawings.

In the drawings: Figure 1 is a side elevation of a portion of a grain drill showing my invention applied. Fig. 2 is a rear elevation of the same. Fig. 3 is a top plan view. Fig. 4 is a vertical section on the line 4—4 of Fig. 1. Fig. 5 is a side elevation of a modification. Fig. 6 is a rear elevation of the same.

Referring particularly to the accompanying drawings, 10 represents one of the seed tubes of the grain drill, while 11 represents the furrow opening disks which are disposed in advance of the said tube 10. Secured to the lower end of the tube 10 on either side thereof and extending rearwardly from the tube are the vertically disposed plates 12, these plates converging slightly downwardly toward each other and running in the furrow. Each of these plates 12 is formed with a slot 13. Secured in any suitable manner to the drill tube 10 and a suitable height above the plates 12 is a rearwardly extending arm 14, the outer end being formed with an elongated slot 15 to receive therethrough the vertical pin 16 carried by the upper end of a fork 17. Rotatably mounted in the lower portion of this fork is a double convex wheel 18, this wheel rotating between the plates 12 and running in the furrow. The lower end of each of the arms of the fork carries a pin 19 which is slidably engaged in one of the slots 13. Carried on the pin 16, and disposed between the arm 14 and the upper end of the fork 17 is a coil spring 20, this spring normally holding the wheel 18 in the bottom of the furrow. Connected to the rear of plates 12 and dragging therefrom are the covering chains 21.

In Figs. 5 and 6, I have shown a slight modification in which I dispense with the arm 14 and the fork 17, this fork being replaced by the fork 22 secured directly to the seed tube 10. The furrow is opened by the disks 11, and the seed is deposited in the furrow from the lower end of the tube 10, and between the forward ends of the plates 12, these plates guiding the seed, so that it is deposited in the center of the furrow, and also holding the furrow walls apart and preventing the earth falling thereinto with the consequent danger of seed being deposited on such soil.

In the ordinary drills, some of the seed reaches the bottom of the furrow, but other seed falls on top of the earth which falls back into the furrow. In this way the seed is not planted at a uniform depth, so that some of the seeds get better starts than others. Now by means of my invention, the walls of the furrow are prevented falling back into the furrow, so that the seed from the tube 10 is free to fall to the bottom of the furrow, the wheel 18 rolling over the seed and pressing the same to a uniform depth in the furrow. The chains 21 dragging behind the plates 12 thus causing the loose earth at the sides of the furrow to fall into the furrow and cover the seed.

What is claimed is:

The combination with the seed tube of a grain drill, of a pair of plates secured to the lower end of the seed tube and extending rearwardly therefrom, said plates converging downwardly and disposed to move in a furrow, each of said walls being slotted, a spring depressed fork carried by the tube, means on the fork slidable in the said slots, and a seed pressing wheel mounted in the fork and moving in the furrow between the plates.

In testimony whereof, I affix my signature, in the presence of two witnesses.

ARTHUR BOTTOM.

Witnesses:
W. J. MCNEIL,
TOM HELMBOLT.

Copies of this patent may be obtained for five cents each, by addressing the "Commissioner of Patents, Washington, D. C."